United States Patent [19]

Finken et al.

[11] Patent Number: 5,718,164
[45] Date of Patent: Feb. 17, 1998

[54] ARRANGEMENT FOR ROASTING VEGETABLE BULK MATERIAL, SUCH AS COFFEE BEANS

[75] Inventors: Hermann Finken, Kleve, Germany; Gerhard Jansen, Heerenberg, Netherlands; Erwin Naves, Dinslaken, Germany

[73] Assignee: Probat-werke von Gimborn Maschinenfabrik GmbH, Emmerich, Germany

[21] Appl. No.: 656,482

[22] Filed: May 31, 1996

[30] Foreign Application Priority Data

Jun. 1, 1995 [DE] Germany .................. 195 20 228.7

[51] Int. Cl.$^6$ .................. A23L 1/00; A47J 27/00; A47J 37/00; F26B 11/00
[52] U.S. Cl. .................. 99/355; 34/134; 34/138; 34/360; 99/447; 99/470; 99/476; 99/483
[58] Field of Search .................. 99/286, 330–333, 99/339, 340, 352–356, 419–421 V, 444–450, 467, 470, 476, 483; 34/109, 134–136, 138, 385, 360, 499, 233, 594, 576, 225; 426/466, 467

[56] References Cited

U.S. PATENT DOCUMENTS

| 3,742,613 | 7/1973 | Von Gimborn | 34/109 |
|---|---|---|---|
| 3,841,826 | 10/1974 | Angstadt et al. | 432/2 |
| 4,425,720 | 1/1984 | Elevitch | 99/450 X |
| 4,494,314 | 1/1985 | Gell, Jr. | 34/368 |
| 4,875,904 | 10/1989 | Munk et al. | 34/67 |
| 4,925,682 | 5/1990 | Miya | 34/238 |
| 5,230,281 | 7/1993 | Wireman et al. | 99/483 |
| 5,257,574 | 11/1993 | Hiromichi | 99/331 X |
| 5,269,072 | 12/1993 | Waligorski | 99/286 X |
| 5,359,788 | 11/1994 | Gell, Jr. | 34/360 |
| 5,386,764 | 2/1995 | Ratajczek | 99/470 X |
| 5,394,623 | 3/1995 | Sewell | 34/494 X |
| 5,564,331 | 10/1996 | Song | 99/476 X |
| 5,573,802 | 11/1996 | Porto | 99/483 X |
| 5,609,097 | 3/1997 | Newman | 99/470 |
| 5,638,607 | 6/1997 | Lemme et al. | 134/136 |

FOREIGN PATENT DOCUMENTS

| 0098387 | 1/1984 | European Pat. Off. |
|---|---|---|
| 0258348 | 3/1988 | European Pat. Off. |
| 0314827 | 5/1989 | European Pat. Off. |
| 0578902 | 1/1994 | European Pat. Off. |
| 1729425 | 3/1972 | Germany . |
| 2103281 | 8/1972 | Germany . |
| 2207803 | 8/1973 | Germany . |
| 2354780 | 5/1975 | Germany . |
| 2501352 | 7/1975 | Germany . |
| 2424142 | 11/1975 | Germany . |
| 2623312 | 12/1976 | Germany . |
| 2645835 | 4/1978 | Germany . |
| 2855492 | 7/1980 | Germany . |
| 3116723 | 12/1982 | Germany . |
| 3430103 | 2/1986 | Germany . |
| 3538352 | 1/1987 | Germany . |
| 3604808 | 8/1987 | Germany . |
| 3711098 | 10/1988 | Germany . |
| 3714594 | 11/1988 | Germany . |
| 4028111 | 3/1992 | Germany . |
| 4028112 | 3/1992 | Germany . |

*Primary Examiner*—Timothy F. Simone
*Attorney, Agent, or Firm*—Foley & Lardner

[57] ABSTRACT

An apparatus for roasting vegetable bulk material, in particular coffee beam is disclosed, in which essentially all of the cooling waste air of a cooler which cools the bulk material after the roasting operation is heated to roasting-gas temperature in a heat-exchanger stage and fed to the roaster. Essentially all of the roasting waste gases are heated, in a heating stage, to an extent which is necessary for increasing the temperature of the cooling gases to the roasting-gas temperature. Since the roaster operates with a higher roasting-gas throughput than hitherto, it is possible, with comparable roasting capacity, for the roasting-gas temperature to be reduced, this resulting in a more uniform roasting result. The apparatus has reduced harmful-substance emission along with increased thermal efficiency. Also disclosed is a method of roasting and cooling bulk material by utilizing the disclosed apparatus.

19 Claims, 4 Drawing Sheets

ARRANGEMENT FOR ROASTING VEGETABLE BULK MATERIAL, SUCH AS COFFEE BEANS

BACKGROUND OF THE INVENTION

1. Field of the Invention

The invention relates to an apparatus and method for roasting vegetable bulk material, in particular, an apparatus and method for roasting coffee beans.

2. Description of Related Art

During roasting of vegetable bulk material, for example coffee, cocoa, cereals or nuts, roasting waste gases laden with aromatic substances are produced. Similar waste gases laden with aromatic substances are produced during cooling of the roasted material following the roasting operation. In the roaster, the roasting material usually is exposed to a roasting-air stream which is heated to a corresponding temperature, is cleaned mechanically from dust or waste products from the roasted material, for example coffee parchment. The roasting-air stream is cleaned downstream of the roaster, for example, in a centrifugal separator (cyclone), and is then subjected to secondary treatment in order to reduce or eliminate the aromatic substances.

The secondary treatment can be effected thermally, for example, by secondary combustion, catalytically or else by means of an adsorption filter. Since the heating of all the roasting waste gases is associated with high energy consumption, it is known to subject a fraction of the roasting gases emerging from the roaster to mechanical cleaning only and to heat them thermally in circulation after renewed heating in an oven, for example, an oil or gas burner, and to feed them to the roaster again. In this manner, the energy consumption of the roasting installation can be lowered considerably.

The cooling gases (e.g. air) used for cooling the roasted material after the roasting operation usually are cleaned only by mechanical means, for example by means of a centrifugal separator, in order then, along with the aromatic substances still contained therein, to be blown into the atmosphere. Such cooling operations, however, pollute the atmosphere, in particular, with aromatic substances.

DE-25 01 352 C2 discloses a roasting device in which the roasting gases (roasting air) heated in a burner are recirculated to the burner via a roasting chamber and a centrifugal separator. The roasting-gas excess produced during roasting is branched off downstream of the centrifugal separator and, after being subjected to secondary combustion in a second burner, is discharged into the atmosphere. The cooling device adjoining the roasting chamber is designed in two stages and is charged with fresh air in both stages. The cooling waste air from the first cooling stage following the roasting chamber in the roasting-material path is mixed with the roasting waste gases at the outlet of the roasting chamber and is recirculated together with the roasting waste gases. The waste air of the second cooling stage is discharged directly into the atmosphere after being cleaned mechanically in a second centrifugal separator.

Similar roasting installations are known from DE-37 11 098 C2, DE-40 28 112 C2 and EP-998 387 A1. In the case of these roasting installations, although the recirculation of the roasting waste gases to the roasting process means that the thermal efficiency is increased and the secondary combustion of a fraction of the cooling waste gases means that the adverse effect to the surroundings due to the aromatic substances also is reduced, the thermal efficiency and the extent to which the waste air is cleaned do not fulfill increased requirements.

It is known from EP-578 902 to heat fresh roasting gases indirectly, via heat exchangers, by hot waste gases of a burner before feeding the same to the roasting chamber. The roasting waste gases are cleaned mechanically in a centrifugal separator before they are fed to the burner from secondary combustion. The fresh roasting gases used for the roasting process thus do not come into contact with the burner waste air and, during secondary combustion, the roasting waste gases are cleaned of aromatic substances. However, the known roasting device does not permit cleaning of the cooling waste gases.

Finally, for the controlled thermal secondary combustion of oxidizable constituents in process waste gases, EP-258 348 B1 discloses that, before the process waste gases which are to be cleaned in a secondary-combustion device are subjected to secondary combustion, they should be preheated in a heat exchanger by heat recovery from the cleaned waste gases. In order to be able to operate the burner of the secondary-combustion device with the same basic load and under constant temperature conditions, the waste gas which is to be cleaned has added to it a fraction of the cleaned waste gas coming from the heat exchanger and, if appropriate, cold air. In this manner, the temperature of the waste gas which is to be cleaned and the concentration of the oxidizable components contained in the waste gas which is to be cleaned can be kept constant.

The secondary-combustion device comprises a burner which is arranged on the end side of an essentially cylindrical housing and opens into a high-speed mixing tube which, for its part, leads to a main combustion space. The heat exchanger is combined with the secondary-combustion device to form a structural unit and comprises a multiplicity of heat-exchange tubes which are arranged in an annular space enclosing the high-speed mixing tube.

Thus, there exists a need to develop an apparatus and method for roasting and cooling vegetable bulk material whereby the apparatus roasts the material with a high thermal efficiency and emits a reduced amount of aromatic substances.

SUMMARY OF THE INVENTION

An object of the invention therefore is to provide an apparatus for roasting and cooling vegetable bulk material, in particular coffee beans, which operates with high thermal efficiency both for the roasting process and for the reduction of emissions.

An additional object of the invention is to provide a method of roasting and cooling vegetable bulk material which reduces aromatic emissions and which operates with a high thermal efficiency.

In accordance with these and other objectives of the invention, there is provided an apparatus for roasting vegetable bulk material, in particular coffee beans, which comprises:

a heating means for heating the cooling gases and providing a roasting-gas stream;

a roasting means for roasting the bulk material in the roasting-gas stream; and a cooling means for receiving the roasted bulk material from the roasting device, and cooling the material in a cooling-gas stream whereby the cooling means discharges its cooling gases to the heating means.

The improvement according to the invention is characterized in that the heating means comprises a heat-exchanger stage which is to be supplied by a heating mechanism such as a heating gas and, for producing the roasting gases, increases the heat content (or temperature) of essentially all the cooling gases discharged from the cooling means to a temperature permitting bulk material to be roasted, and discharges the same as roasting gas to the roasting device.

In accordance with an additional object of the present invention, there is provided a method of roasting and cooling a bulk material including:

a) heating a cooling gas air stream used to cool the bulk material in a cooling means to provide a roasting-gas stream;

b) roasting the bulk material in a roasting means by contacting the bulk material with the roasting-gas stream to generate a roasted bulk material;

c) cooling the roasted bulk material in a cooling means by contacting the roasted bulk material with an air stream to generate a cooled bulk material and a cooling gas air stream; and d) providing the cooling gas air stream to step a).

These and other objects of the present invention will be readily apparent to those skilled in the art upon reading the detailed description of the invention that follows.

DETAILED DESCRIPTION OF THE PREFERRED EMBODIMENTS

Figure 1:
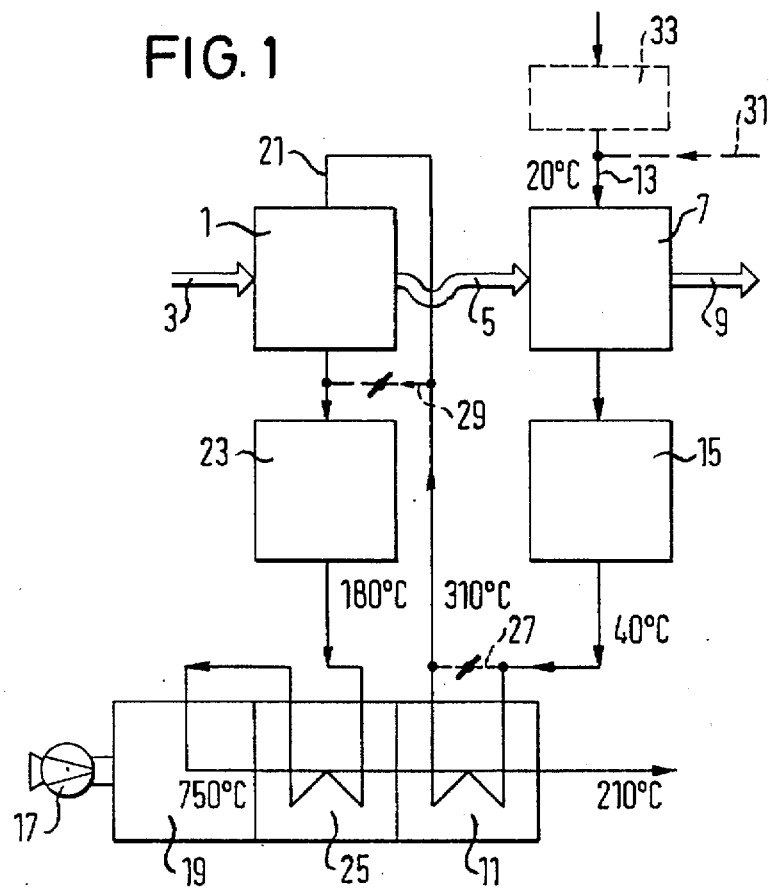
FIG. 1 illustrates a schematic block diagram of a roasting and cooling apparatus for vegetable bulk material.

The invention is based on the idea of increasing the heat level (hereinafter "temperature") of the cooling gases, which is increased in any case by the cooling process, indirectly to the temperature of roasting gases in a heat exchanger without contacting burner waste gases or the like. Hence, the function of the cooling waste gases is changed, via the heat exchanger, to roasting gases. In this manner, the heat energy of essentially all the cooling waste gases is utilized for the roasting process and, thereafter, all the heat energy of essentially all the roasting gases can be recovered; this reducing the structural outlay. In addition, the cleaning of the roasting waste gases is considerably simpler. Moreover, since the gas stream is heated to roasting-gas temperature indirectly, impairment to the taste of the roasting material is avoided.

The heating means can produce the heat-exchanger-supplying heating gases in a heating-gas stream which is separate from the roasting gases. A particularly high thermal efficiency can be obtained if, furthermore, the heating means comprises a heating stage which increases the temperature of essentially all of the roasting gases discharged from the roasting device to beyond the roasting-gas temperature, and then discharges the same as heating gas to the heat-exchanger stage. In this arrangement, after a renewed increase in their temperature, essentially all the roasting waste gases are utilized as heating gases supplying the heat-exchanger stage.

A very low degree of harmful-substance emission, in particular aromatic emission, can be achieved if provision is made for means for adsorption cleaning and/or thermal and/or catalytic cleaning of the roasting gases and/or heating gases. Since essentially all of the cooling waste gases are fed to the roasting process and essentially all of the roasting waste gases are cleaned, in particular cleaned thermally and/or catalytically at the temperature of the heating gases, before at least a fraction of the heat energy is obtained in the heat-exchanger stage, it is possible to achieve very efficient cleaning of the waste air along with high overall efficiency of the roasting device.

Surprisingly, it has been found that an increase in the roasting quality can be achieved by means of utilizing all the cooling air for the roasting operation. Conventional roasting devices operate with a roasting-gas throughput which is considerably smaller than the cooling-air throughput of the associated cooling device. For example, the roasting-gas throughput can be approximately a third of the cooling-air throughput. Due to the lower roasting-gas throughput, conventional roasting devices operate at a comparatively high temperature of the roasting gases in the order of magnitude of 450° C. Since the invention brings the roasting-gas throughput into line with the cooling-air throughput, this increases the roasting-gas throughput in comparison with conventional installations. The increased roasting-gas throughput then makes it possible to feed the same wasting energy at reduced roasting-gas temperature. The roasting-gas temperature expediently lies between 290° and 390° C., and preferably between 300° and 360° C., which makes possible more uniform roasting of the roasting material.

Although the heating means may also be designed as an electric heating stage or infrared heating stage or the like, it is preferably a burner stage which subjects the roasting gases to harmful-substance combustion. The burner stage designed as a gas or oil burner is preferably a blower-type burner.

A gas cleaning stage which cleans the heating gas catalytically may be arranged in the heating-gas path between the heating means and the heat-exchanger mechanism which increases the temperature of the cooling gas to roasting-gas heat level. This gas cleaning stage which cleans the heating gas of aromatic substances may also be provided in addition to a burner stage which is likewise used for aromatic reduction and subjects the roasting waste gas to secondary combustion.

Gas cleaning means, for example, centrifugal separators, may likewise be arranged in the cooling-gas path between the cooling device and the heat-exchanger mechanism which increases the cooling gases to roasting-gas temperature and/or in the roasting-gas path between the wasting means and the heating means. In addition, an adsorption filter, for example, a zeolite filter, may also be provided in the roasting-gas path in order to reduce the aromatic substances, even if the roasting waste gases, subsequently, are not just heated to the heating-gas heat level, but are subjected to secondary combustion for cleaning.

A further increase in the overall thermal efficiency can be achieved if the heating device comprises a further heat-exchanger mechanism which is to be supplied by the heating gases of the heating means and increases the temperature of essentially all the roasting gases discharged from the roasting means to the heating means. In this manner, the temperature of the roasting gases can be increased, before feeding to the heating means, by heat recovered from the heating gases. As long as the heating means ensures secondary combustion of the roasting waste gases, it goes without saying that the further heat-exchanger mechanism is arranged such that a sufficiently long dwell time of the heating gases at the high secondary-combustion temperature level is ensured.

In a preferred configuration, it is provided that the heating means and the heat-exchanger mechanisms are combined to form a structural unit in which, coaxial with one another, the heat-exchanger mechanisms enclose a central, tubular burning chamber, one end of which adjoins a burner, in particular a gas or oil burner. Such a structural unit is comparatively compact and ensures sufficiently long dwell times of the heating gases in the region of the heat-exchanger mechanisms and in the region of the secondary-combustion zone.

The above-mentioned advantages can be achieved, in particular, if the heat-exchanger mechanisms comprise heating-gas conducting chambers which are in the form of annular spaces which enclose the combustion chamber and in which there are arranged a multiplicity of tubes which extend essentially along the combustion chamber, open, at their ends, into annular collecting lines and are intended for conducting the cooling and/or roasting gases. In order to achieve a more favorable thermal efficiency, the heat-exchanger mechanism which heats the cooling gases to roasting-gas temperature encloses the further heat-exchanger mechanism externally in the radial direction.

It is favorable for compact construction, along with increased thermal efficiency, if the heating-gas conducting chambers form a serial flow path for the heating gases, in particular if the cooling gases and/or the roasting gases flow through the tubes counter to the flow direction of the heating gases in the heating-gas conducting chambers. Heating-gas conducting chambers which are located coaxially one inside the other result in a meandering construction, as seen in the radial direction.

That end of the burner chamber which is remote from the burner preferably opens into a buffer chamber and/or widened portion. The buffer chamber reduces the flow speed of the heating gases before they are fed to the heat-exchanger mechanism, which can be separated into one, two or three or more stages, and prolongs the dwell time of the heating gases in a high-temperature zone which ensures thermal cleaning.

At least the heat-exchanger mechanism which increases the heat content of the cooling gases to roasting-gas heat level is expediently bridged, in the cooling-gas path and/or in the heating-gas path, by a bypass line with controllable throughflow cross section. In this manner, despite indirect heating of the roasting gases, quick-response roasting-gas temperature regulation can be achieved.

Fresh air from the surroundings can be fed to the cooling means. However, it has proved to be expedient if the waste air of further air-controlled devices of the roasting process are also included in the cleaning process of the roasting means, the waste air of such processing stages being fed as cooling supply air, for example, to a stoning stage of the cooling device. The overall emission level of the roasting installation can be further reduced in this manner.

Referring now to FIG. 1, the vegetable bulk material, preferably, coffee-bean roasting installation represented schematically in FIG. 1 comprises a roasting means 1, such as a roaster 1 to which the coffee beans which are to be roasted are fed at 3. The coffee beans roasted in a roasting-gas stream in the roaster 1 are fed, at 5, to a cooling means 7, such as a cooler 7 in which they are cooled in a cooling-gas stream, and they are discharged, at 9, to a grinding and/or packaging station (not shown in any more detail). The roaster 1 can roast the coffee with batch-wise operation or continuous operation. The same applies to the cooler 7. Examples of suitable roasting means are those described in EP-314 827 A1, the disclosure of which is incorporated by reference herein in its entirety. Other types of roasting also may be used. In addition, use may be made of the installation for roasting other vegetable bulk material, for example cocoa, cereals or nuts and the like.

The roaster 1 preferably is dimensioned such that, once the entire cooling-gas stream which flows through the cooler 7 for cooling the roasting material has been heated in a heat-exchanger mechanism or heat-exchanger stage 11 to roasting-gas temperature, the roaster 1 can receive this cooling-gas stream and utilize it for the roasting operation. The cooling gas, which is expediently air, can be fed in the cooler 7 means or cooler 7, at an ambient temperature of, for example, 20° C., at 13 and, after the cooling process, can be cleaned from dust and roasting-material residue, e.g. coffee parchment, in a cleaning stage, for example a centrifugal separator 15. The cooling-waste-air temperature may be increased, for example, to 40° C. by the cooling operation, then can be brought indirectly in the heat exchanger 11, by heating gases heated by an oil or gas burner 17 of a burner stage 19, to a roasting-gas temperature sufficient for roasting the bulk material, preferably, coffee beans, and then can be fed to the roaster 1 at 21.

The cleaned cooling waste gases heated in the heat exchanger 11 thus form the roasting gases which roast the coffee beans in the roaster 1. The roaster 1 discharges the roasting waste gases via a further mechanical cleaning stage, for example a centrifugal separator 23, to a further heat-exchanger stage 25 which is located in the heating-gas path between the burner stage 19 and the heat-exchanger stage 11. This heat exchanger stage 25 increases the roasting-waste-gas temperature to, for example, 180° C. and discharges the roasting waste gas which has been pre-heated in this manner to the burner stage 19 for secondary combustion. The burner stage 19 increases the roasting waste gases which have thus been fed essentially in their entirety for secondary combustion to a temperature of, for example, between 700° and 800° C., for example 750° C., at which harmful substances contained in the roasting waste gas, in particular aromatic substances, are burnt and destroyed essentially completely. The roasting waste gases which have been subjected to secondary combustion form the ready-heated heating gases whose heat energy is recovered in the heat-exchanger stages 25 and 11. At the outlet of the heat-exchanger stage 11, the heating gases still may have a temperature of, for example, 210° C. and can be discharged to the surroundings via a stack.

In the case of the roasting installation explained above, all the cooling air used for cooling the roasting material in the cooler 7 also can be utilized for the roasting operation, and subjected to secondary thermal treatment in the burner stage 19 for the elimination of aromatic emissions. The indirect heating of the cooling air to roasting-gas heat level prevents the roasting air from coming into contact with heating-air harmful substances. Essentially all the cooling and roasting waste air is utilized for heat recovery. Thus, the heat-exchanger stage 11 and the roaster 1 may be bridged by cooling-gas and/or roasting-gas bypass lines 27 and 29, respectively, the flow cross section of which can be changed by control valves in order for it to be possible to regulate the heat quantity which is to be received in the heat-exchanger stage 11 or is to be discharged in the roaster 1.

Since the roaster 1 receives essentially all of the air throughput of the cooler 7, it has to be dimensioned for a higher roasting-gas throughput than conventional roasters of comparable roasting capacity. If the cooler 7 is dimensioned, for example, for a standardized air throughput of 3000 m³ per hour, then the standardized throughput at the outlet of the roaster 1 is increased to 3400 m³ per hour, while, ultimately, after flow through the heat-exchanger stage 11, a standardized throughput of 3800 m³ per hour are discharged to the surroundings. This roasting-gas throughput, which is high in comparison with conventional roasters, makes it possible for the temperature of the roasting gases which are to be fed to the roaster 1 to be lowered to from 290° to 390° C., preferably to between 300° and 360° C., more preferably, 310° C. With a reduced roasting-gas temperature, the coffee beans are thus roasted more carefully and uniformly than hitherto.

The cooler 7 can take in the air used for cooling from the surroundings, as is indicated at 31. Expediently, however, the waste air of a further processing stage of the roasting installation, for example the waste air of a stoning stage indicated at 33, is included, as cooling air, in the air cleaning process.

Figure 2:
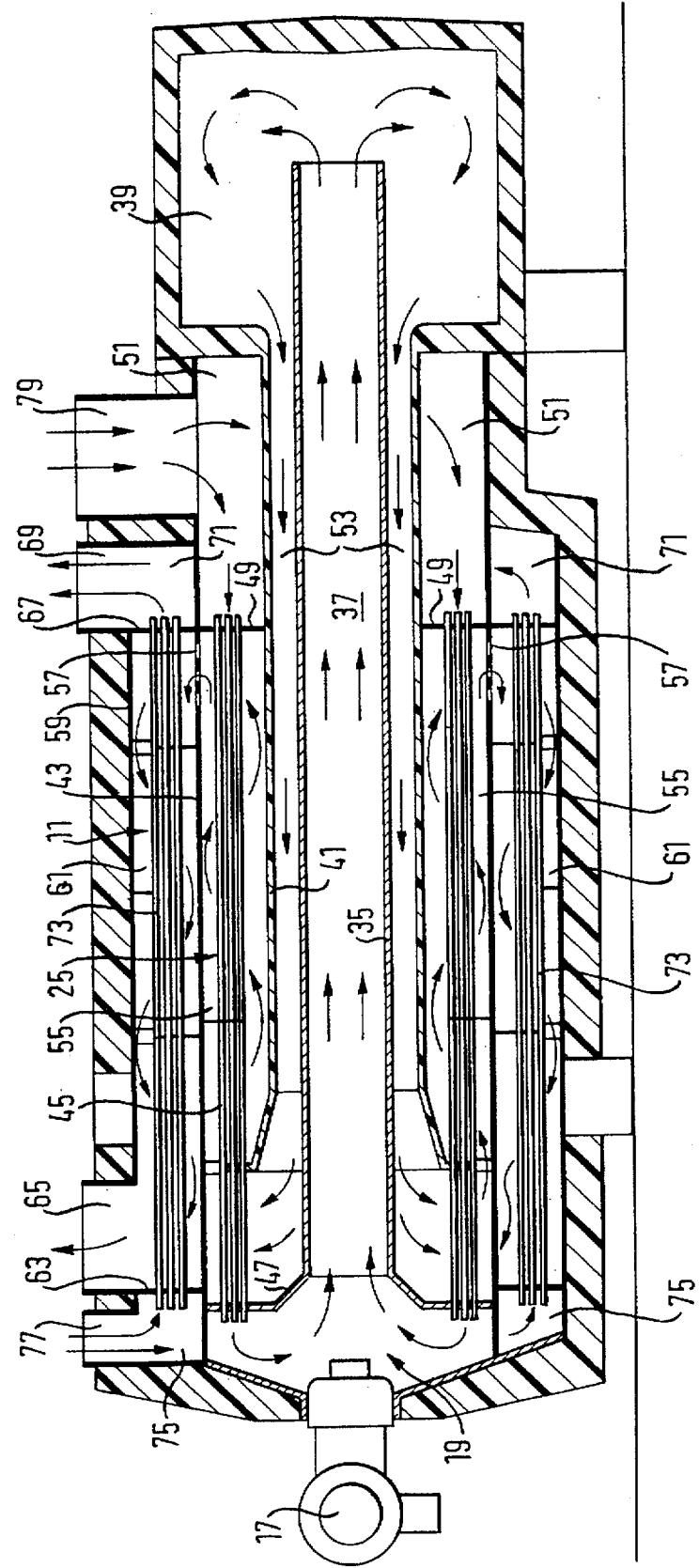
FIG. 2 illustrates a sectional view of a heating and heat-exchanger unit of the arrangement according to FIG. 1.

The burner 17, which is preferably a blower-type burner, combines the burner stage 19, which forms an oven, and the two heat-exchanger stages 11 and 25 to form a block-like structural unit. FIG. 2 shows details of such a structural unit. The burner stage 19 can have a combustion chamber 37 which is long in comparison with the diameter of the burner stage, is enclosed by a tube 35, has the burner 17 arranged at one end, and opens, by means of its other end, into a buffer chamber 39. The heat-exchanger stages 11, 25 enclose the tube 35 coaxially, the heat-exchanger stage 11 coaxially enclosing the heat-exchanger stage 25 externally in the radial direction. Radially toward the inside, the heat-exchanger stage 25 is bounded by a tube wall 41 which encloses the tube 35 at a radial distance and, radially toward the outside, by a tube wall 43.

Extending between the tube walls 41, 43, approximately parallel to the tube 35 and distributed in the circumferential direction thereof, is a multiplicity of exchanger tubes 45 which, at their end which is adjacent to the burner 17, pass through an end wall 47 which terminates the tube 35 toward the tube wall 43 and, at their other end, pass through an end wall 49 of a collecting space 51 which adjoins on this side and encloses the tube wall 41 in an annular manner. The tube wall 41 forms the radially inner boundary of the connecting space 51 and leaves between it and the tube 35 a heating-gas conducting chamber 53 which is in the form of an annular space and connects the buffer chamber 39 to an inlet end, which faces the burner 17, of a heating-gas conducting chamber 55 which extends between the tube walls 41, 43 along the exchanger tubes 45. Provided adjacent to the collecting space 51, distributed in the circumferential direction in the tube wall 43, are a multiplicity of through-passage openings 57 through which the heating gases can pass into a heating-gas conducting chamber 61 which is formed between the tube wall 43 and an outer wall 59, is coaxial with the tube 35 and belongs to the heat-exchanger stage 11. The heating-gas conducting chamber 61 is terminated, at its burner end, by an end wall 63 which connects the tube wall 43 to the outer wall 59 and is provided, in the region of the end wall 63, with an outlet 65.

At the buffer-chamber end, in the vicinity of the openings 57, but between the latter and the annular space 51, a further end wall is provided between the tube wall 43 and the outer wall 59. Together with the tube wall 43 and the outer wall 59, the end wall 67 bounds a further annular collecting space 71 provided with an outlet 69. Extending along the heating-gas conducting chamber 61, distributed in the circumferential direction, are a multiplicity of exchanger tubes 73 which, similar to the exchanger tubes 45, pass through the end walls 63, 67 by means of their open ends and are open, on the one hand, into the collecting space 71 and, on the other hand, into an annular collecting space 75 which is bounded by the tube wall 43, the outer wall 59 and the end wall 63. The collecting space 75 is provided with an inlet opening 77. An inlet opening, which leads through the housing wall 59, of the annular space 51 is represented at 79.

The heating gases emerging from the centrifugal separator 23 at the outlet of the roaster 1 are fed via the inlet opening 79 and distributed, via the annular space 51, to the exchanger tubes 45 of the heat-exchanger stage 25. In the region of the burner 17, the exchanger tubes 45 open into the combustion chamber 37, where they are heated to the temperature necessary for the thermal secondary combustion, for example 750° C.

In order to ensure a sufficiently long reaction time which is appropriate for the thermal secondary combustion, the heating gases at high temperature flow, in the direction of the arrows shown in FIG. 2, through the tube 35 into the buffer chamber 39 and along the heating-gas conducting chamber 53 back to the burner-side annular inlet of the heating-gas conducting chamber 55 which contains the exchanger tubes 45 and belongs to the heat-exchanger stage 25, where they ensure pre-heating of the gases fed from the roaster. The heating gases passing from the heat-gas conducting chamber 55, via the openings 57, into the heating-gas conducting chamber 61 of the heat-exchanger stage 11 here heat the cooling waste gases, flowing in the exchanger tube 73 from the inlet opening 77 to the outlet opening 69, of the cooler 9 to roasting-gas heat level and then pass out via the outlet opening 63. It should also be mentioned that the flow direction in the exchanger tubes 45, 73 is in each case directed counter to the flow direction of the heating gases in the heating-gas conducting chambers 55 and 61. The exchanger tubes 45, 73 prevent the gases conducted therein from coming into contact with the heating gases.

The exemplary embodiments explained hereinbelow utilize the principle explained with reference to FIG. 1. Components which have the same function are designated with the reference numerals from FIG. 1, and are provided with a letter for differentiation. For explanatory purposes, please refer to the description of FIG. 1.

Figure 3:
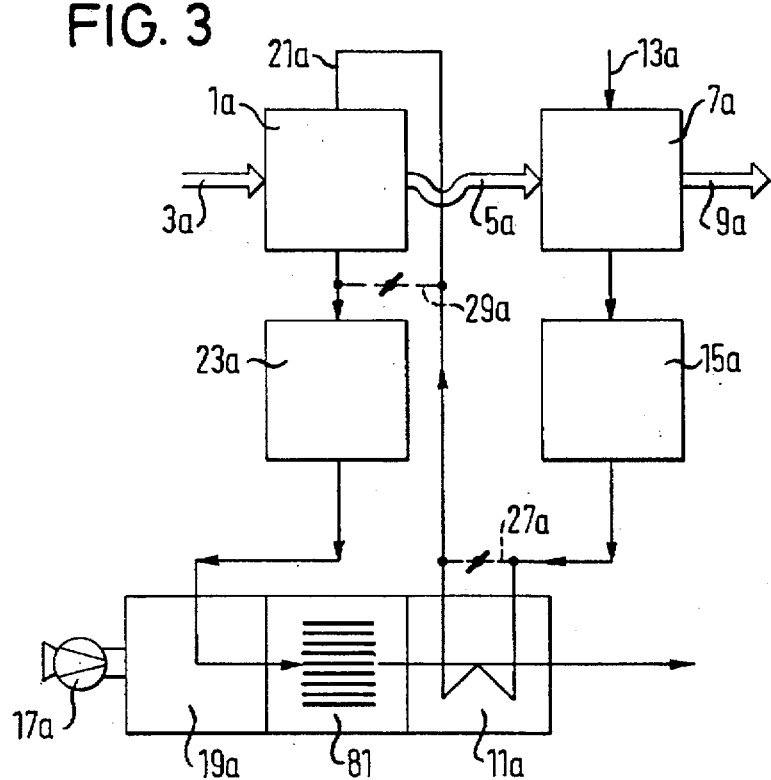
FIG. 3 illustrates a variant of the arrangement according to FIG. 1.

FIG. 3 shows an embodiment of the installation from FIG. 1, this variant differing mainly in that, in order to clean the heating gases of aromatic substances, provision can be made for catalytic combustion of the heating gases in a catalyst stage 81, which is added into the heating-gas path between the burner stage 19a and the heat-exchanger stage 11a. The roasting waste gases discharged from the centrifugal separator 23a at the outlet of the roaster 1a are brought, in the burner stage 19a, to a heating-gas heat level sufficient for the catalytic combustion and then pass through the catalyst stage 81 before the secondary-combustion heat in the heat-exchanger stage 11a is recovered for producing the roasting gases.

The burner stage 19a, the catalyst stage 81 and the heat-exchanger stage 11a may be combined to form a structural unit in the manner explained with reference to FIG. 2, it being possible for at least the burner stage 19a and the heat-exchanger stage 11a to have the coaxial construction explained there. The catalyst stage 81 may be arranged axially beside the heat-exchanger stage 11a or it may be arranged with respect to the heat-exchanger stage 11a such that the two are located coaxially one on top of the other. The catalyst of the catalyst stage 81 may be an oxidation catalyst which is designed for a dwell time of the heating gases of between 0.05 and 0.1 seconds at a reaction temperature of between 320° C. and 420° C.

Figure 4:
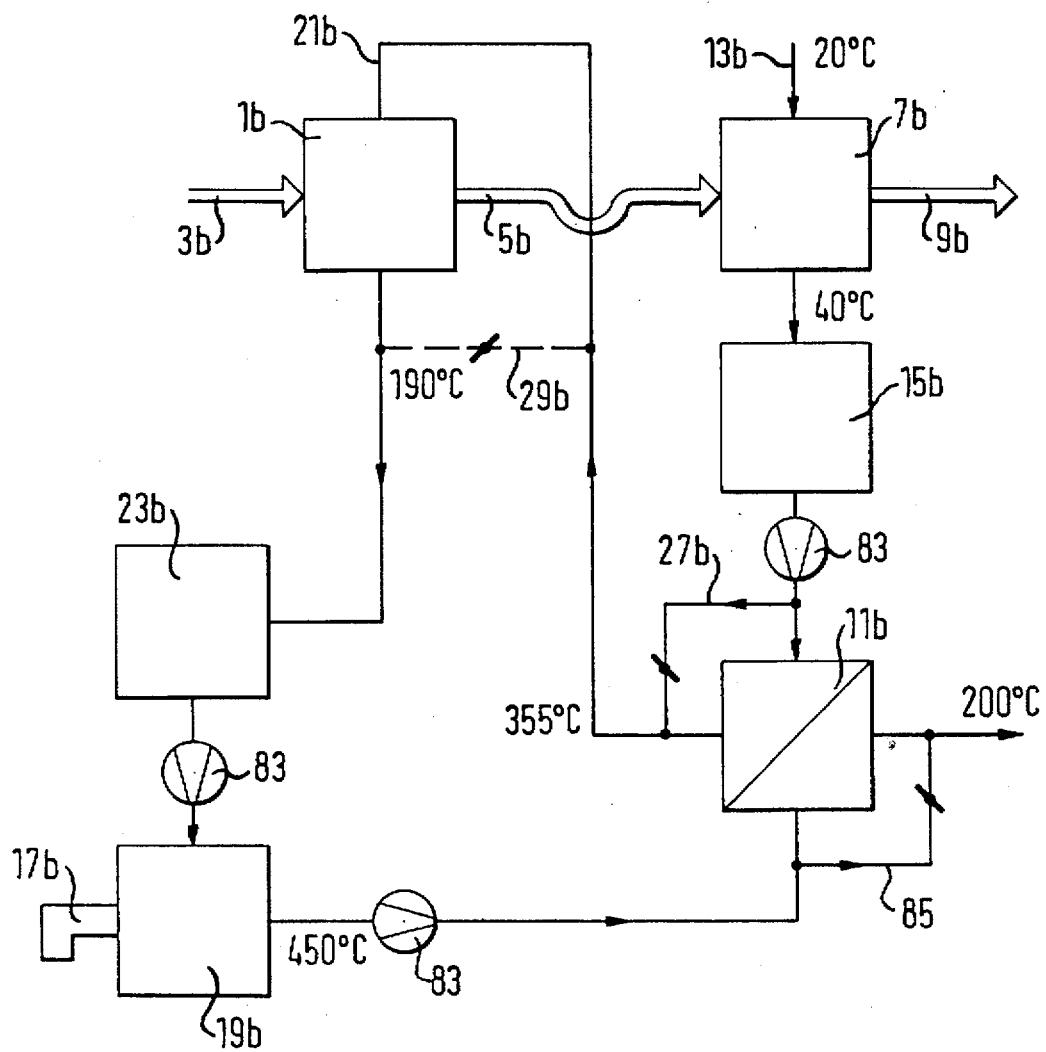
FIG. 4 illustrates a schematic block diagram of a further novel arrangement for roasting vegetable bulk material.

FIG. 4 shows another embodiment of the roasting apparatus in which the burner stage 19b is designed as a combustor, and the burner 17b heats the roasting waste gases in pulse operation, at burning pulses of a duration of, for example, 0.1 seconds, to approximately 700° to 800° C. In addition to the exemplary embodiments explained above, blowers 83 are also represented at the inlet and outlet of the combustor 19b and at the outlet of the centrifugal separator 15b. In addition, or alternatively, to the bypass lines 27b and 29b, a bypass line with a damper or a valve serving for heat-quantity regulation may also be provided, as represented at 85, in the heating-gas path of the heat-exchanger state 11b. The pulse burner 17b burns gas or oil essentially without residue, the combustion waste gases being mixed with the fed roasting waste gases in the combustor 19b.

Figure 5:
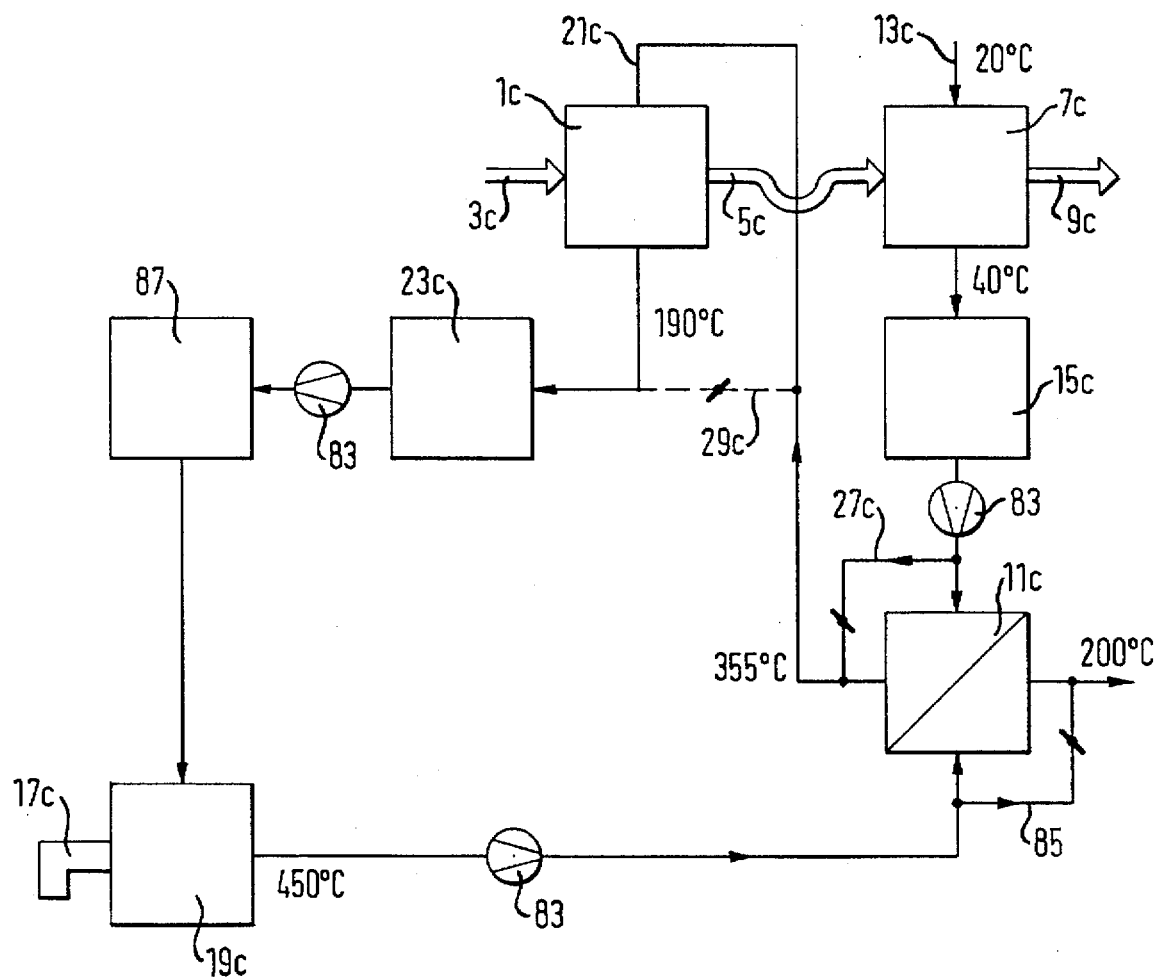
FIG. 5 illustrates a schematic block diagram of a variant of the arrangement according to FIG. 4.

FIG. 5 shows yet another embodiment of the roasting apparatus according to FIG. 4, in the case of which, in addition between the centrifugal separator 23c and the blower-type burner 19c for oil or gas, an adsorption filter 87 is arranged in the flow path of the roasting waste gases, for example a filter based on zeolite powder. All that the burner 19c thus has to do is to heat the temperature level of the roasting waste gases to the extent necessary for increasing the heat level of the cooling waste gases to roasting-gas heat level. The blower 83 and the bypass line 85 may also be provided here in the manner represented.

It goes without saying that, in the exemplary embodiments of FIGS. 4 and 5 too, the combustor 19b and blower-type burner 19c may be combined with the heat-exchanger stage 11b and 11c in each case to form a structural unit, like the structural unit shown in FIG. 2.

Although it is not represented in any more detail in the exemplary embodiments of FIGS. 3 to 5, it is also possible here for the cooling supply air to be taken either from the surroundings or from the waste air of a further processing stage, for example a stoning stage.

Although the invention has been described in detail with reference to particularly preferred embodiments, those skilled in the art will appreciate that various modifications can be made without significantly departing from the spirit and scope thereof. Each of the documents described above are incorporated by reference herein in their entirety.

What is claimed is:

1. An apparatus for roasting vegetable bulk material, comprising:
   a) a heating means for heating a cooling-gas stream discharged from said cooling means, thereby producing a roasting-gas stream;
   b) a roasting means for roasting said bulk material by contact with said roasting-gas stream;
   c) a cooling means for cooling said roasted bulk material, whereby said cooling means receives the roasted bulk material from said roasting means, cools said material in a cooling-gas stream and discharges at least a fraction of its cooling gases to said heating means;
   whereby the heating means comprises a heat-exchanger stage supplied by heating gases, which increases the temperature of essentially all of the cooling gases discharged from said cooling means to a temperature permitting the bulk material to be roasted so as to generate a roasting-gas stream, and discharges said roasting gas to said roasting means.

2. An apparatus according to claim 1, wherein the temperature of the roasting-gas stream discharged from the heat-exchanger stage is within the range of from 290° C. to 390° C.

3. An apparatus according to claim 1, wherein a gas cleaning mechanism is disposed in the cooling-gas path between said cooling means and the heat-exchanger stage which increases the temperature of the cooling gases.

4. An apparatus according to claim 1, wherein said heating means further comprises a heating stage which increases the temperature of essentially all the roasting gases discharged from said roasting means to beyond the roasting-gas temperature to generate a heating gas, and discharging said heating gas to said heat-exchanger stage.

5. An apparatus according to claim 4, wherein said heating stage is a burner stage which subjects the roasting gases to combustion.

6. An apparatus according to claim 5, wherein the burner stage comprises a gas or oil pulse burner.

7. An apparatus according to claim 4, wherein a gas cleaning stage which cleans the heating gas by means of an oxidation catalyst is disposed in the heating-gas path between said heating stage and said heat-exchanger stage.

8. An apparatus according to claim 4, wherein a gas cleaning stage is disposed in a roasting-gas path between said roasting means and said heating stage.

9. An apparatus according to claim 1, further comprising cleaning means for adsorption cleaning, thermal cleaning, for catalytic cleaning of said roasting gases leaving said roasting means, or heating gases leaving said heating stage.

10. An apparatus according to claim 1, wherein an adsorption filter is disposed between said roasting means and said heating stage.

11. An apparatus according to claim 4, wherein said heating means comprises a further heat-exchanger stage which is to be supplied by the heating gases of said heating stage and increases the temperature of the roasting gases discharged from said roasting means to said heating stage.

12. An apparatus according to claim 11, wherein said heating stage and said heat-exchanger stage and said further heat-exchanger stage are combined to form a structural unit in which said heat-exchanger stage and said further heat-exchanger stage are disposed coaxial with one another and enclose a central, tubular combustion chamber, one end of which adjoins a burner.

13. An apparatus according to claim 12, wherein said heat-exchanger stage and said further heat-exchanger stage comprise heating-gas conducting chambers to transport said cooling gases and said heating gas which are in the form of annular spaces, enclose said combustion chamber and in which there are arranged a multiplicity of tubes which extend essentially along the combustion chamber and open, at their ends, into annular collecting spaces.

14. An apparatus according to claim 13, wherein said combustion chamber and said heating-gas conducting chambers form a serial flow path for the heating gases.

15. An apparatus according to claim 13, wherein the cooling gases and/or the roasting gases flow through said tubes counter to the flow direction of said heating gases in the heating-gas conducting chambers.

16. An apparatus according to claim 12, wherein said heat-exchanger stage encloses said further heat-exchanger stage externally in the radial direction.

17. An apparatus according to claim 12, wherein the end of said combustion chamber which is remote from said burner opens into a buffer chamber.

18. An apparatus according to claim 1, wherein at least said heat-exchanger stage is bridged, in the cooling-gas path and/or in the heating-gas path, by a bypass line with controllable throughflow cross section.

19. An apparatus according to claim 1, wherein waste air from a further processing stage comprises said cooling gas stream.

* * * * *